(12) United States Patent
Balasaygun et al.

(10) Patent No.: US 10,880,338 B2
(45) Date of Patent: Dec. 29, 2020

(54) SYSTEM AND METHOD FOR PROVIDING TO PUSH NOTIFICATIONS TO COMMUNICATION ENDPOINTS

(71) Applicant: Avaya Inc., Santa Clara, CA (US)

(72) Inventors: Mehmet Balasaygun, Freehold, NJ (US); Eric Cooper, Kanata (CA)

(73) Assignee: Avaya Inc., Santa Clara, CA (US)

( * ) Notice: Subject to any disclaimer, the term of this patent is extended or adjusted under 35 U.S.C. 154(b) by 111 days.

(21) Appl. No.: 15/890,998

(22) Filed: Feb. 7, 2018

(65) Prior Publication Data

US 2019/0245895 A1    Aug. 8, 2019

(51) Int. Cl.

| | | |
|---|---|---|
| *G06F 15/16* | (2006.01) | |
| *H04L 29/06* | (2006.01) | |
| *H04L 29/08* | (2006.01) | |
| *H04L 12/58* | (2006.01) | |
| *H04L 29/12* | (2006.01) | |
| *H04L 12/26* | (2006.01) | |

(52) U.S. Cl.
CPC .... *H04L 65/1006* (2013.01); *H04L 29/06095* (2013.01); *H04L 51/00* (2013.01); *H04L 61/00* (2013.01); *H04L 65/105* (2013.01); *H04L 67/26* (2013.01); *H04L 67/28* (2013.01); *H04L 69/22* (2013.01); *H04L 43/10* (2013.01)

(58) Field of Classification Search
CPC ... H04L 29/08072; H04L 29/06; H04L 43/10; H04L 65/105
USPC ................. 709/220, 224, 228, 227
See application file for complete search history.

(56) References Cited

U.S. PATENT DOCUMENTS

| | | | | |
|---|---|---|---|---|
| 9,009,851 B2* | 4/2015 | Droste | ................ | G06F 21/6245 |
| | | | | 726/28 |
| 9,088,586 B2* | 7/2015 | Jun | .................... | H04W 36/0083 |
| 9,191,521 B2* | 11/2015 | Robbins | ............. | H04L 65/1076 |
| 9,241,074 B1* | 1/2016 | Robbins | ............. | H04L 65/1076 |
| 9,319,530 B2* | 4/2016 | Robbins | ............. | H04L 65/1076 |
| 9,603,070 B2* | 3/2017 | Jun | ..................... | H04L 65/1073 |
| 10,194,023 B1* | 1/2019 | Kong | .................. | H04M 7/0069 |
| 2006/0015141 A1* | 1/2006 | Linder | .................... | A61F 2/013 |
| | | | | 606/200 |
| 2009/0213839 A1* | 8/2009 | Davis | ...................... | H04L 43/00 |
| | | | | 370/352 |
| 2013/0326639 A1* | 12/2013 | Droste | .................... | G06F 21/55 |
| | | | | 726/28 |

(Continued)

OTHER PUBLICATIONS

Nectoux "FlexiSIP Push Gateway," Belledonne Communications, Sep. 2016, 11 pages.

(Continued)

*Primary Examiner* — Khanh Q Dinh
(74) *Attorney, Agent, or Firm* — Sheridan Ross P.C.

(57) ABSTRACT

A first Session Initiation Protocol (SIP) INVITE message is received to establish a communication session where a communication application, in a first communication endpoint that is used to establish the communication session has been suspended or is not running. A first message is sent that causes the communication application to become active. A second message is received from that indicates that the communication application is active. Various processes are then used to establish the communication session with the previously suspended or not running communication application.

20 Claims, 6 Drawing Sheets

(56) References Cited

U.S. PATENT DOCUMENTS

2014/0153408 A1\* 6/2014 Jun .................. H04L 43/10
370/250

OTHER PUBLICATIONS

Rosenberg et al. "SIP: Session Initiation Protocol," Internet Engineering Task Force Network Working Group, Jun. 2002, RFC 3261, 269 pages.

\* cited by examiner

SYSTEM AND METHOD FOR PROVIDING TO PUSH NOTIFICATIONS TO COMMUNICATION ENDPOINTS

BACKGROUND

Mobile operating system vendors, for example, Apple's iOS™, have in recent years started changing the way they handle applications that are not visible (i.e., running in the background). For example, in order to improve battery conservation on the mobile device, background applications may be suspended or even terminated. Some mobile operating system vendors have started using Hyper Text Transfer Protocol (HTTP)-based push notification services that are used to route incoming events (e.g., incoming call notifications) to mobile applications that are running in the background. Apple® has been the leader in this area where it introduced push notification services with the introduction of iOS 10™. This change requires most applications to integrate with PushKit APIs that allow applications to receive events through Apple's push notification services. Eventually, all applications may be required to use the push notification services that require the background applications only run when absolutely necessary.

This can cause problems with applications, such as Voice over IP (VoIP) applications that require the client application to at least be partially active in the background to maintain proper connection information with a proxy server. For example, under the new push notification services, client applications cannot run timers to periodically wake up and refresh Session Initiation Protocol (SIP) registrations and subscriptions to the proxy server. As a result, the following problems may be encountered by a SIP based VoIP/video mobile application in a communication endpoint: 1) the application's SIP registration and subscriptions may time out without the application's knowledge; 2) loss of SIP registrations may cause the communication endpoint to no longer receive incoming SIP calls; 3) loss of SIP subscriptions causes the communication endpoint to no longer receive network updates such as message waiting status update, feature status changes, etc.; 4) Transmission Control Protocol (TCP) based sockets may close over time. For example, an application with an active SIP registration may have its SIP signaling socket connection closed by the proxy server if the proxy server has TCP keep-alives enabled. In addition, TCP keep-alives are handled at the TCP/IP stack level and do not generate application level triggers in iOS; and 5) detecting an incoming SIP call has become more complicated. For example, assuming a SIP endpoint has an active SIP registration over a connection-oriented TCP protocol, a SIP proxy server will send an incoming SIP INVITE request towards the registered SIP contact address once, and will not retransmit. This is in according to SIP transmission rules defined in https://tools.ietf.org/html/rfc3261 section 17.1.1. An Apple Push Notification may wake up the endpoint and allow the VoIP application to re-register with the SIP server, but this does not mean the proxy server will re-issue the SIP INVITE request over a new socket connection. This means the single issued SIP INVITE request will likely sit in a stale socket connection towards the communication endpoint, which results in the failure of the call.

SUMMARY

These and other needs are addressed by the various embodiments and configurations of the present disclosure. A first Session Initiation Protocol (SIP) INVITE message is received to establish a communication session where a communication application, in a first communication endpoint that is used to establish the communication session has been suspended or is not running. A first message is sent that causes the communication application to become active. A second message that is received indicates the communication application is active. To establish the communication session with the communication application in the communication endpoint, one or more of the following options are used:

1) a SIP NOTIFY message is sent that causes the communication application to send a SIP INVITE message with either a Replaces header or a Join header and the SIP INVITE message with either the Replaces header message or the Join header is sent to a second communication endpoint;
2) a SIP 302 MOVED TEMPORARILY message is received and in response, a second SIP INVITE message is sent to the communication application based on a SIP redirection address in the SIP 302 MOVED TEMPORARILY message;
3) the SIP 302 MOVED TEMPORARILY message is received, wherein the SIP 302 MOVED TEMPORARILY message is sent in response to a HTTP POST message sent by the communication application, and in response the second SIP INVITE message is sent to the communication application;
4) the SIP 302 MOVED TEMPORARILY message is received, wherein the SIP 302 MOVED TEMPORARILY message is sent in response to a SIP INFO or a SIP NOTIFY message sent by the communication application, and in response, the second SIP INVITE message is sent to the communication application; and
5) the second SIP INVITE message is sent to the communication application in response to receiving the second message from the communication application that indicates that the communication application is active.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

In this document, the use of standard SIP messages/headers (e.g., a SIP INVITE, a SIP INVITE with Replaces header, a SIP INVITE with Join header, a SIP REGISTER, a SIP 200 OK, a SIP SUBSCRIBE, a SIP NOTIFY etc.) are being used consistent with the current SIP standards. Thus, one of skill in the art of SIP would clearly understand that different defined SIP messages cannot be freely interchanged with each other because this would violate the current SIP standards. For example, a SIP INVITE message (used to establish a communication session) cannot be substituted for a SIP INVITE with Replaces header message (used to replace a dialog (i.e., a call leg) in a SIP communication session) because these messages are designed for different purposes according to the SIP standards.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
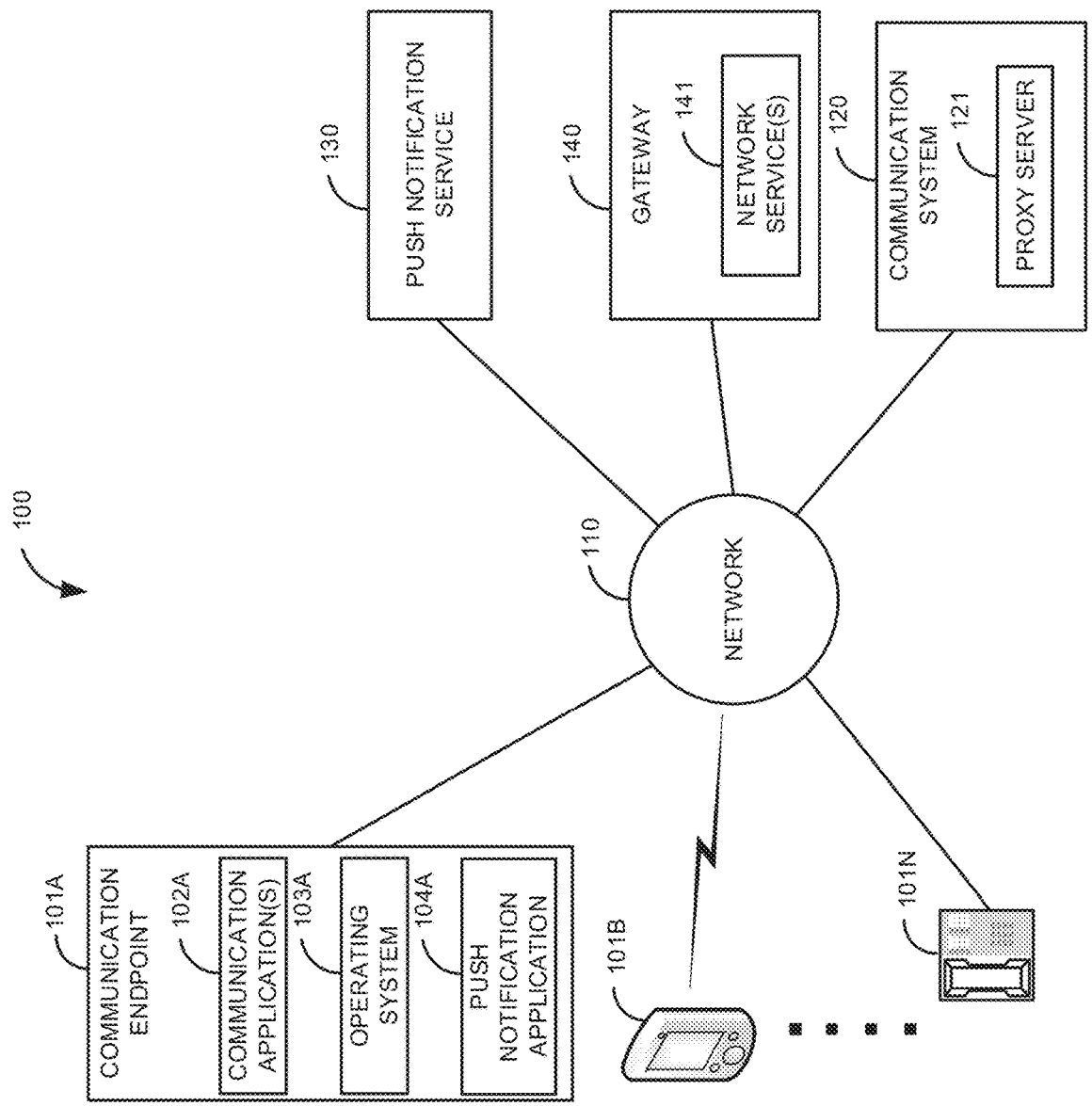
FIG. 1 is a block diagram of a first illustrative system for managing a SIP communication session in push notification network.

FIG. 1 is a block diagram of a first illustrative system 100 for managing a SIP communication session in push notification network. The first illustrative system 100 comprises communication endpoints 101A-101N, a network 110, a communication system 120, a push notification service 130, and a gateway 140.

The communication endpoints 101A-101N can be or may include any communication endpoint device that can communicate on the network 110, such as a Personal Computer (PC), a telephone, a video system, a cellular telephone, a Personal Digital Assistant (PDA), a tablet device, a notebook device, a web server, a media server, a smartphone, a cellular phone, a voicemail system, an Interactive Voice Response (IVR) system, a conference bridge, and/or the like. The communication endpoints 101A-101N are devices where a communication session ends. The communication endpoints 101A-101N are not network elements that facilitate and/or relay a communication session in the network, such as a communication manager or router. As shown in FIG. 1, any number of communication endpoints 101A-101N may be connected to the network 110.

The communication endpoint 101A further comprises communication application(s) 102A, an operating system 103A, and a push notification application 104A. Although not shown, communication endpoints 101B-101N may also include one or more communication applications 102, one or more operating systems 103, and the push notification application 104.

A communication application(s) 102A can be any software and/or hardware application(s) that can provide services from the communication endpoint 101A. For example, the communication application(s) 102A may be a SIP application, a softphone, a contact center application, a Voice over Internet Protocol (VoIP) application, a web application, a chat application, an email application, a social networking application, a calendar application, a voicemail application, a browser, a gaming application, a virtual reality application, a consumer application, and/or the like.

The operating system 103A can be or may include any type of operating system, such as a time-sharing operating system, a multi-tasking operating system, a non-multi-tasking operating system, and the like. The operating system may be a Linux® operating system, a Windows® operating system, a macOS® operating system, an iOS® operating system, a Unix® operating system, and/or the like. The operating system 103A may comprise multiple operating systems 103A that can run independent of each other, either concurrently or singularly.

The push notification application 104A, which is typically a component of the operating system 103A can be or may include any application that can send and receive messages from the push notification service 130. The push notification application 104A can receive messages from the push notification service 130 and can then direct the messages to specific communication application(s) 102A on the communication endpoint 101A.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a wireless network, a combination of these, and the like. The network 110 can use a variety of electronic protocols, such as Ethernet, Internet Protocol (IP), Session Initiation Protocol (SIP), Integrated Services Digital Network (ISDN), Hyper Text Transfer Protocol (HTTP), Transmission Control Protocol (TCP), Transport Layer Security (TLS), Web Real-Time Communication (Web RTC) protocol, and/or the like. Thus, the network 110 is an electronic communication network configured to carry messages via packets and/or circuit switched communications. In one embodiment, the network 110 may comprise a push notification network with one or more push notification services 130 that work in conjunction with one or more communication systems 120 and one or more gateways 140 to provide push notification services to multiple communication endpoints 101.

The communication system 120 can be or may include any hardware coupled with software that can manage and route different types of communication sessions, such as a Private Branch Exchange (PBX), a session manager, a communication manager, a central office switch, a router, and/or the like.

The communication system 120 further comprises a proxy server 121. The proxy server 121 can be used to establish communication sessions between two or more communication endpoints 101A-101N. For example, the proxy server 121 may be a SIP proxy server 121. In one embodiment, the proxy server 121 may be external to the communication system 120.

The push notification service 130 can be or may include any hardware coupled with software that can provide notification services to the communication endpoints 101A-101N. In one embodiment, the push notification service 130 is an HTTP push notification service, such as the push notification service supported by Apple®. The push notification service 130 is used to send notifications to communication endpoints 101A-101N that are then used by the communication applications 102. For example, the push notification service 130 may send a notification to a communication endpoint 101 that causes one or more of the communication applications 102 to become active (where the communication application 102 was previously suspended) or to be started (where the communication application 102 was previously terminated).

The gateway 140 can be or may include any hardware coupled with software that can provide network services 141 for the communication endpoints 101A-101N. For example, the gateway 140 may be a session border controller, an application server, and/or the like. In one embodiment, the gateway 140 may be part of the communication system 120.

The gateway 140 further comprises network service(s) 141. The network service(s) 141 can provide various kinds of network service(s) 141 for the communication applications 102 in the communication endpoints 101A-101N. The network services 141 can act as an intermediary service for each of the communication applications 102 on the communication endpoints 101A-101N. For example, the network service(s) 141 may provide services that allow the communication application(s) 102 to receive notification(s) of event(s) during period where the communication application(s) 102 have been suspended or are not running. In one embodiment, the network service(s) 141 may implemented as a SIP Back-to-Back User Agent (B2BUA).

Figure 2:
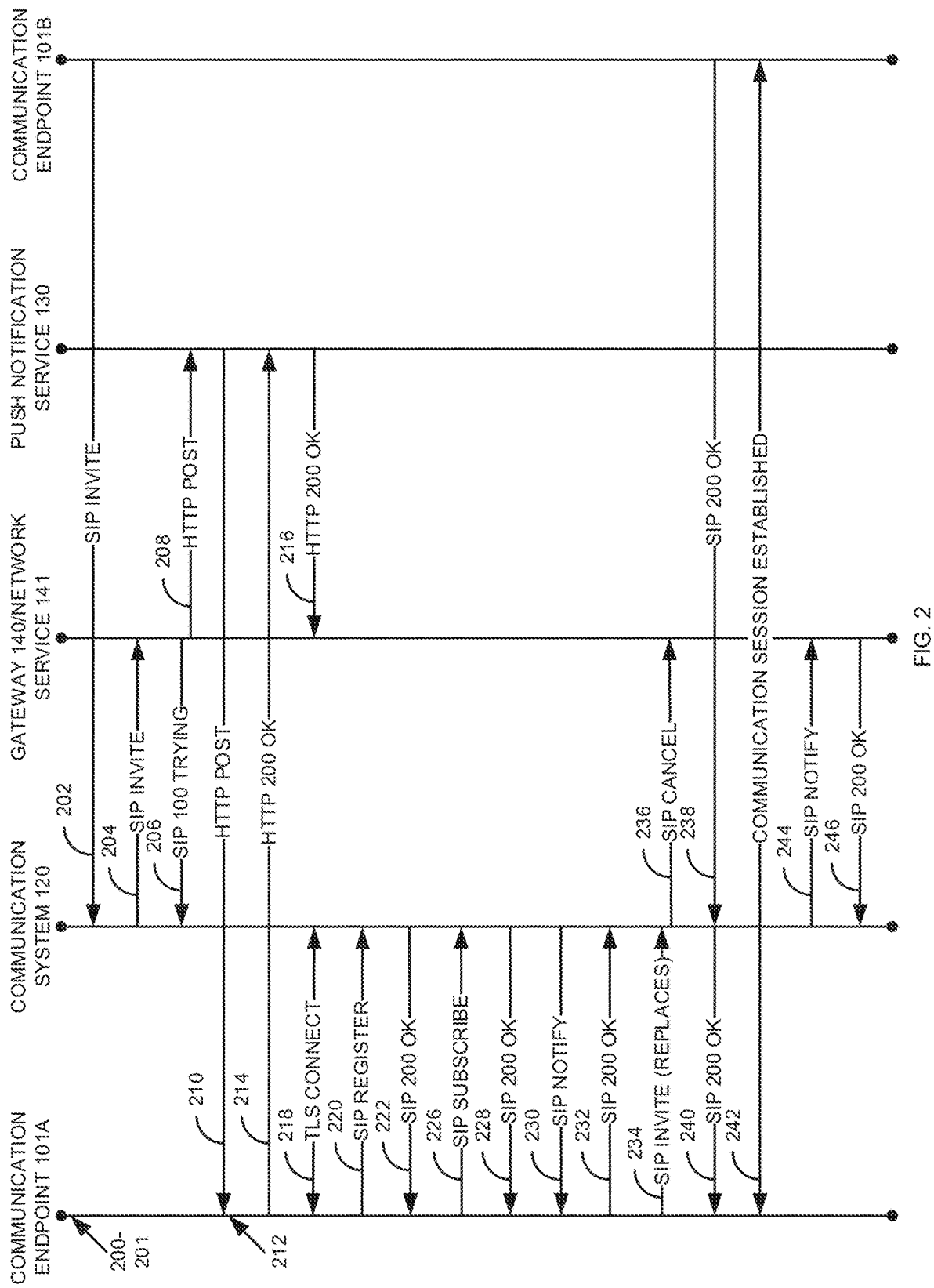
FIG. 2 is a flow diagram of a first process for managing a SIP communication session in a push notification network.

FIG. 2 is a flow diagram of a first process for managing a SIP communication session in a push notification network. Illustratively, the communication endpoints 101A-101N, the communication applications 102A, the operating system 103A, the push notification application 104A, the communication system 120, the proxy server 121, the push notification service 130, the gateway 140, and the network service(s) 141 are stored-program-controlled entities, such as a computer or microprocessor, which performs the method of FIGS. 2-6 and the processes described herein by executing program instructions stored in a computer readable storage medium, such as a memory (i.e., a computer memory, a hard disk, and/or the like). Although the methods described in FIGS. 2-6 are shown in a specific order, one of skill in the art would recognize that the steps in FIGS. 2-6 may be implemented in different orders and/or be implemented in a multi-threaded environment. Moreover, various steps may be omitted or added based on implementation.

The process described in FIGS. 2-6 describe the use of SIP messaging. For simplicity, some well-known SIP messages are not shown. For example, SIP ACK messages are not shown being sent in response to SIP 200 OK messages.

Moreover, the processes described in FIGS. 2-6 are discussed for a single communication session between two communication endpoints 101A and 101B. However, one of skill in the art would recognize that a communication session may be between more than two communication endpoints (e.g., communication endpoints 101A-101N). In addition, the processes described in FIGS. 2-6 may be used for multiple concurrent communication sessions between different sets of communication endpoints 101A-101N.

In addition, the process described in FIGS. 2-6 are described using SIP messaging. However, the embodiments described herein are not limited to SIP. One of ordinary skill in the art would understand that other types of protocols may be used, such as H.323, Web Real-Time Communication (WebRTC) protocol, HTML, and/or the like.

The process starts in step 200. In step 200, (though not shown) the communication application 102A registers with the communication system 120 and/or the gateway 140. In response, the gateway 140 creates an instance of the network service 141 that corresponds to the communication application 102A. The instance of the network service 141 is created to handle requests while the communication application is suspended or not running. In step 201, the communication application 102A, in the communication endpoint 101A, has either been suspended or has been terminated by the operating system 103A. For example, the communication endpoint 101A is a mobile device and the communication application 102A is a SIP soft phone application that was initially running in the background. The operating system 103A (e.g., iOS) has either suspended or terminated the communication application 102A in order to conserve power on the communication endpoint 101A. If the operating system 103A has suspended the communication application 102A, state variables are typically stored on a stack. If the communication application 102A has been terminated, the communication application 102A may store state information and application variables when terminated in a memory on the communication endpoint 101A.

The communication endpoint 101B (e.g., via a network element, such as a router) sends, in step 202, a SIP INVITE message to the communication system 120 (e.g., the proxy server 121). The gateway 140 has instantiated a network service 141 (e.g., a SIP B2BUA) on behalf of the communication application 102A. The purpose in the instantiated network service 141 is to handle messages for the suspended or terminated communication application 102A until the communication application can become active. The communication system 120 (e.g., the proxy server 121) sends the SIP INVITE message of step 202 to the gateway 140/network service 141 in step 204. In one embodiment (not shown), the communication system 120 may first send the SIP INVITE message of step 202 to the communication application 102A (e.g., to a specific TCP socket/IP address). If no response to the SIP INVITE message is received (because the communication application 102A has been suspended or terminated by the operating system 103A), the communication system 120 sends the SIP INVITE message, in step 204, to the gateway 140/network service 141. Alternatively, the SIP INVITE of step 202 may be sent in parallel to both the communication endpoint 101A and the gateway 140/network service 141 to see if the communication application 102A is active. This option can reduce delays that are incurred in the network if the communication application 102A is active.

In response to the receiving the SIP INVITE message of step 204, the gateway 140/network service 141 sends a SIP 100 TRYING message to the communication system 120 in step 206. Although not shown, the communication system 120 may also send a SIP 100 TRYING message (after step 202) to the communication endpoint 101B.

The gateway 140/network service 141 sends an HTTP POST message, in step 208, to the push notification service 130. In response, the push notification service 130 sends a HTTP POST message, in step 210, to the communication endpoint 101A. The operating system 103A, via the push notification application 104A, recognizes that the HTTP POST message of step 210 is for the communication application 102A. The HTTP POST message comprises information that specifically identifies the communication application 102A, such as a unique number, a Universal Resource Identifier (URI), a name, and/or the like.

The operating system 103A either resumes the communication application 102A (if the communication application 102A is suspended) or loads and executes the communication application 102A (if the communication application 102A was terminated) in step 212. The push notification application 104A in the communication endpoint 101A sends, in step 214, an HTTP 200 OK to acknowledge the HTTP POST of step 210 to the push notification service 130. The push notification service 130 sends, in step 216, the HTTP 200 OK message of step 214 to the gateway 140/network service 141 in step 216.

The process of steps 208-216 may be implemented in various ways. For example, a protocol other than HTTP may be used.

In response to step 212, the communication application 102A establishes a secure TLS connection with the communication system 120 in step 218. For example, the secure TLS connection of step 218 may use a specific TCP port to establish the secure TLS connection. In this case, the TCP port may be a different TCP port (and/or IP address) than previously used by the communication application 102A. Once the secure TLS connection is established in step 218, the communication application 102A sends a SIP REGISTER message to the communication system 120 in step 220. The SIP REGISTER message indicates that the communication application 102A is active and can establish a communication session. The communication system 120 sends a SIP 200 OK message to the communication application 102A in step 222.

The communication application 102A sends, in step 226, a SIP SUBSCRIBE message to be notified for dialog events. The dialog events are for the existing (incoming, active, terminated, etc.) call sessions that exist in the communication system 120 for the user associated with the communication endpoint 101A. In response to the SIP SUBSCRIBE message of step 226, the communication system 120 sends, in step 228, a SIP 200 OK to the communication application 102A.

The communication system 120 sends, in step 230, a SIP NOTIFY message (based on the SIP SUBSCRIBE message of step 226) that comprises information for the incoming call (dialog events). For example, the information in the SIP NOTIFY message of step 230 may include an incoming call that the communication system has for the user of the communication endpoint 101A (connection information that was in the SIP INVITE message of step 204). The communication endpoint 101A can then use this information to establish a communication session with the communication endpoint 101B and send a media stream (e.g., voice or video in a call) to the communication endpoint 101B. The communication application 102A sends, in step 232, a SIP 200 OK to acknowledge the SIP NOTIFY message of step 230.

The communication application 102A sends, in step 234, a SIP INVITE with Replaces header message. The SIP INVITE with Replaces header message allows the communication endpoint 101A is to identify a remote SIP call session and to alert the gateway 140/network service 141 that the local user will be picking up the call. In addition, the SIP INVITE with Replaces header message may contain additional information, such as a new IP address of the communication endpoint 101A because it may have changed since the communication application 102A was suspended or terminated. The communication system 120 uses the SIP INVITE with Replaces header message to replace the SIP dialog (a call leg) between the gateway 140/network service 141 and the communication system 120. As a result, the communication system 120 sends, in step 236, a SIP CANCEL message to the gateway 140/network service 141. The communication system 120 sends the SIP 200 OK message to the communication endpoint 101A in step 240 that establishes the communication session in step 242. At this point, the communication endpoint 101B has the necessary information to establish a media session (e.g., voice or video) to the communication endpoint 101A. For example, the communication endpoint 101B can now establish a media session (e.g., using Real-Time Communication (RTC) protocol) to send a voice stream in the communication session. The communication system 120 sends a SIP NOTIFY message to the gateway 140/network service 141 in step 244. The SIP NOTIFY informs the network service 141 that the communication session has successfully been established between the communication endpoints 101A and 101B. The gateway 140/network service 141 sends, in step 246, a SIP 200 OK to acknowledge the SIP NOTIFY message of step 244.

In one embodiment, the SIP INVITE with Replaces header message of step 234 may instead be a SIP INVITE message with a Join header. Instead of replacing the dialog from the communication system 120 to the gateway 140/network service 141, the communication endpoint 101A joins the communication session instead. In this embodiment, the message in step 236 is a SIP INVITE message with Join header instead of a SIP INVITE with Replaces header message.

Figure 3:
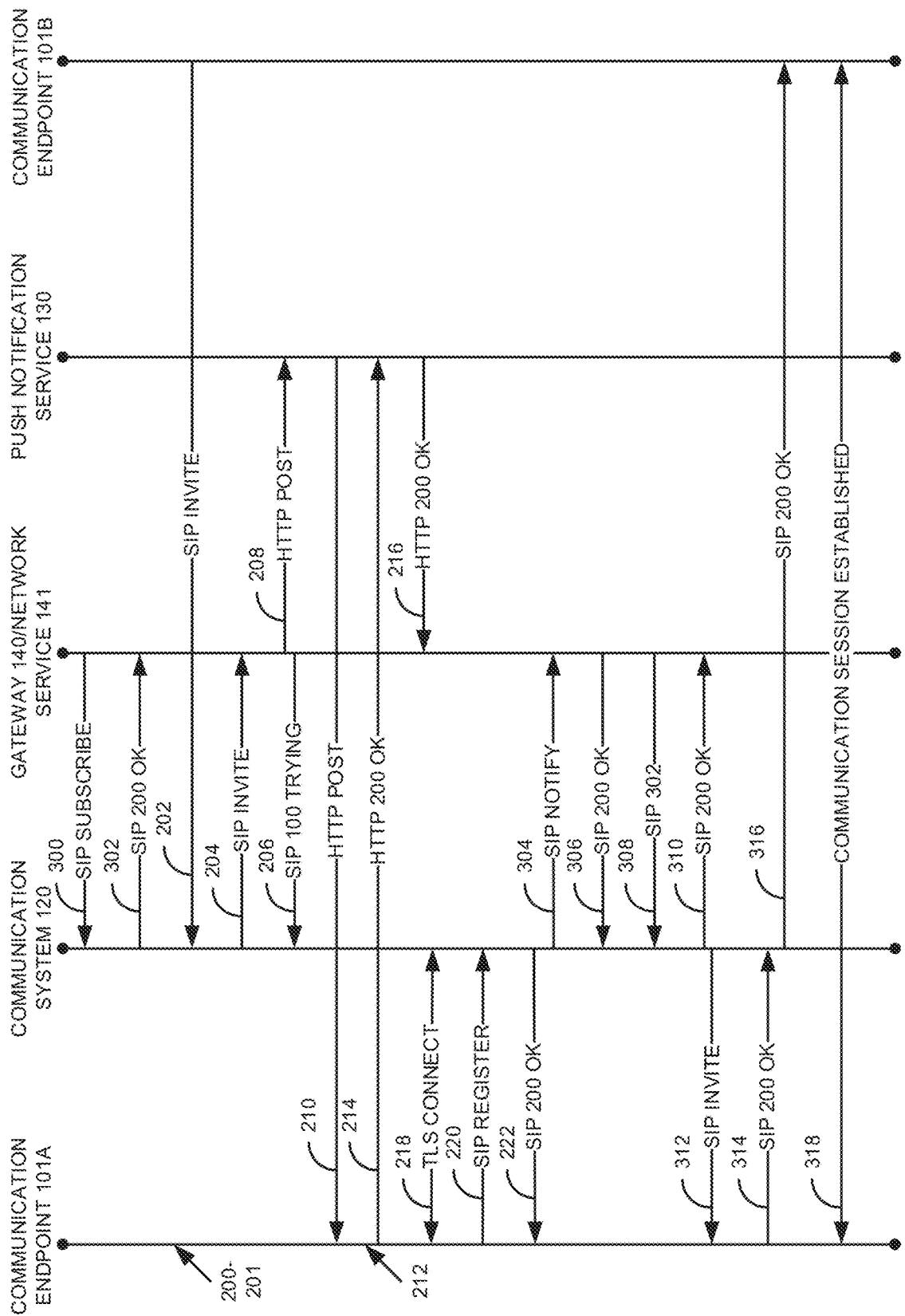
FIG. 3 is a flow diagram of a second process for managing a SIP communication session in a push notification network.

FIG. 3 is a flow diagram of a second process for managing a SIP communication session in a push notification network. The process starts in step 300 when the gateway 140/network service 141 sends, in step 300, a SIP SUBSCRIBE message to the communication system 120. The purpose of the SIP SUBSCRIBE message is be notified when the communication application 102A becomes active (an event). The communication system 120 responds by sending a SIP 200 OK message, in step 302, to the gateway 140/network service 141.

Steps 200-222 are then implemented in the same manner discussed above in FIG. 2 where the communication application 102A is un-suspended or activated by the push notification service 130 (steps 200-216), the communication application 102A connects (step 218), and registers with the communication system 120 (steps 220-222).

In response to the communication application 102A registering in step 220, the communication system 120 sends, in step 304, a SIP NOTIFY message to the gateway 140/network service 141. The SIP NOTIFY message of step 304 tells the gateway 140/network service 141 that the communication application 102A is now active and can be used to establish the communication session. The gateway 140/network service 141 sends, in step 306, a SIP 200 OK message to the communication system 120.

In response to the SIP NOTIFY message that indicates that the communication application 102A is active, the gateway 140/network service 141 sends, in step 308, a SIP 302 MOVED TEMPORARILY message to the communication system 120. The SIP 302 MOVED TEMPORARILY message comprises information to allow the communication system 120 to generate the new SIP INVITE message of step 312. For example, the information in the SIP 302 MOVED TEMPORARILY message may comprise information that is associated with the gateway 140/network service 141 (from the SIP INVITE message 204) and information from the SIP NOTIFY (the latest connection information for the communication application 102A/communication endpoint 101A). This information allows the communication system 120 to generate the SIP INVITE message of step 312. In response to the SIP 302 MOVED TEMPORARILY message, the communication system 120 sends a SIP 200 OK message to the gateway 140/network service 141 in step 310.

The communication system 120 sends, in step 312, the SIP INVITE message. The SIP INVITE message of step 312 is a forked version of the SIP INVITE message of step 204 that is addressed to the communication endpoint 101A instead of the network service 141. The communication application 102A sends, in step 314, a SIP 200 OK message to the communication system 120. The communication system 120 sends, in step 316, the SIP 200 OK message to the communication endpoint 101B. At this point, the communication session is established in step 318 and the communication endpoint 101B has the necessary information to send media (e.g., voice or video) to the communication endpoint 101A. For example, the communication endpoint 101B can now establish a media stream (e.g., using Real-Time Communication (RTC) protocol) to send a video stream in the communication session.

Figure 4:
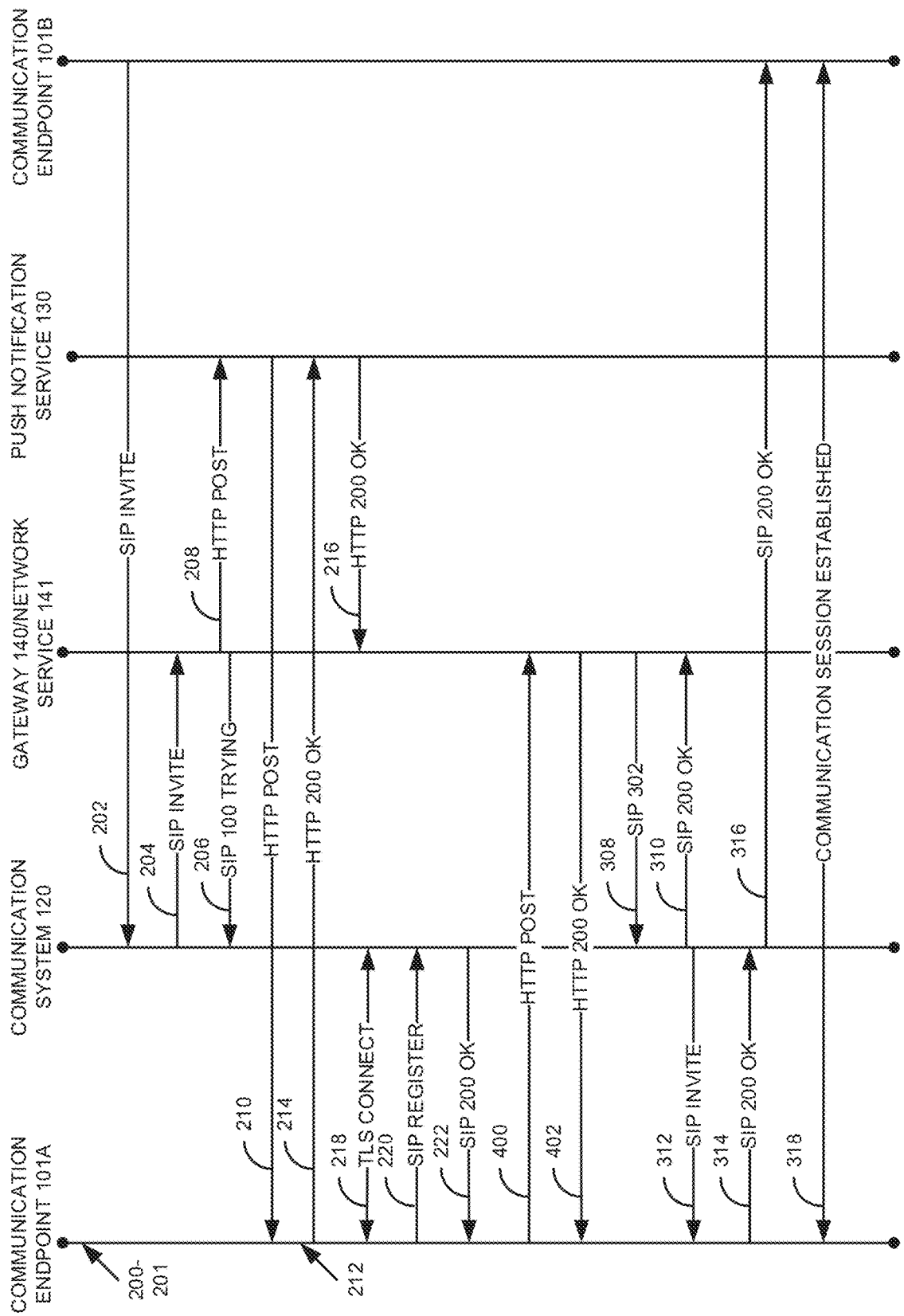
FIG. 4 is a flow diagram of a third process for managing a SIP communication session in a push notification network.

FIG. 4 is a flow diagram of a third process for managing a SIP communication session in a push notification network. In FIG. 4, steps 200-222 are implemented in the same manner discussed above in FIG. 2 where the communication application 102A is un-suspended or activated by the push notification service 130 (steps 200-216), the communication application 102A connects (step 218), and registers with the communication system 120 (steps 220-222).

The communication application 102A sends, in step 400, an HTTP POST message to the gateway 140/network service 141. The HTTP POST message of step 400 notifies the gateway 140/network service 141 that the communication application 102A is now active and can establish a communication session. In response, the gateway 140/network service 141 sends, in step 402 a HTTP 200 OK message. In response to receiving the HTTP POST of step 400, the process described above for FIG. 3 of steps 308-318 are implemented in a similar manner of sending a SIP 302 MOVED TEMPORARILY message (step 308), sending a SIP 200 OK (step 310), sending a SIP INVITE message (step 312), sending a SIP 200 OK message (steps 314 and 316), and establishing the communication session/media stream (step 318). The process of FIG. 4 allows the communication session to be established when the communication application 102A was initially suspended or not running.

Figure 5:
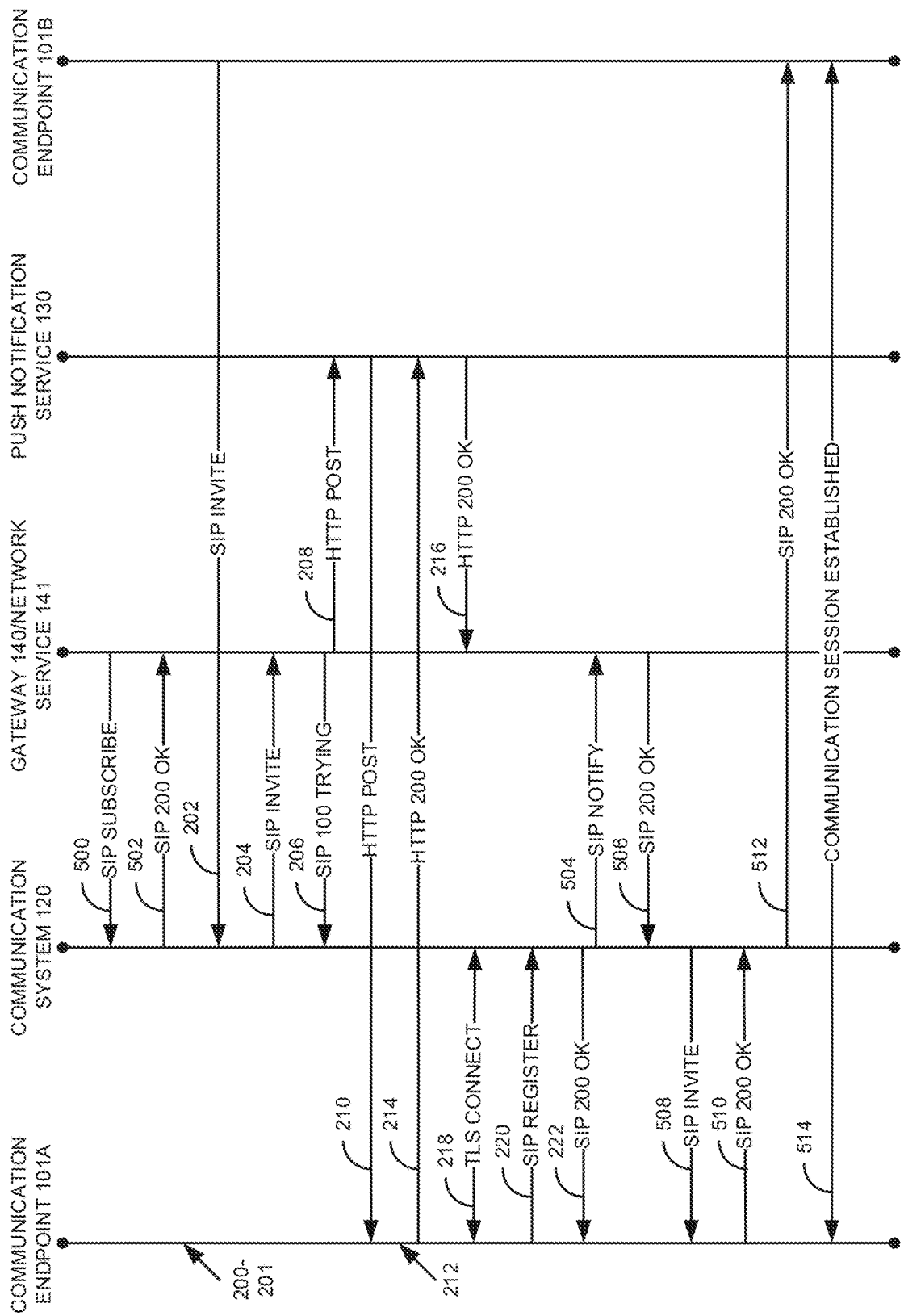
FIG. 5 is a flow diagram of a fourth process for managing a SIP communication session in a push notification network.

FIG. 5 is a flow diagram of a fourth process for managing a SIP communication session in a push notification network. The process starts in step 500 when the gateway 140/network service 141 sends, in step 500, a SIP SUBSCRIBE message to the communication system 120. The purpose of the SIP SUBSCRIBE message is to register to be notified when the communication application 102A becomes active (an event). The communication system 120 responds by sending a SIP 200 OK message, in step 502, to the gateway 140/network service 141.

Steps 200-222 are then implemented in the same manner discussed above in FIG. 2 where the communication application 102A is un-suspended or activated by the push notification service 130 (steps 200-216), the communication application 102A connects (step 218), and registers with the communication system 120 (steps 220-222).

In response to the communication application 102A registering in step 220, the communication system 120 sends, in step 504, a SIP NOTIFY message to the gateway 140/network service 141. The SIP NOTIFY message of step 504 tells the gateway 140/network service 141 that the communication application 102A is now active and can be used to establish a communication session. The gateway 140/network service 141 sends, in step 506, a SIP 200 OK message to the communication system 120.

Before step 508, the communication system 120 cancels the SIP INVITE sent in step 204 by sending a SIP CANCEL message to the gateway 140/network service 141 (not shown for simplicity). The communication system 120 forks the SIP INVITE message of step 204 using the information for the TLS connect of step 218 by sending a SIP INVITE message in step 508 to the communication application 102A. In response, the communication application 102A sends, in step 510, a SIP 200 OK to the communication system 120. The communication system 120 sends, in step 512, the SIP 200 OK to the communication endpoint 101B.

At this point, the communication session is established in step 514 and the communication endpoint 101B has the necessary information to establish a media session (e.g., voice or video) to the communication endpoint 101A. For example, the communication endpoint 101B can now establish a media stream (e.g., using Real-Time Communication (RTC) protocol) to send a video stream in the communication session.

Figure 6:
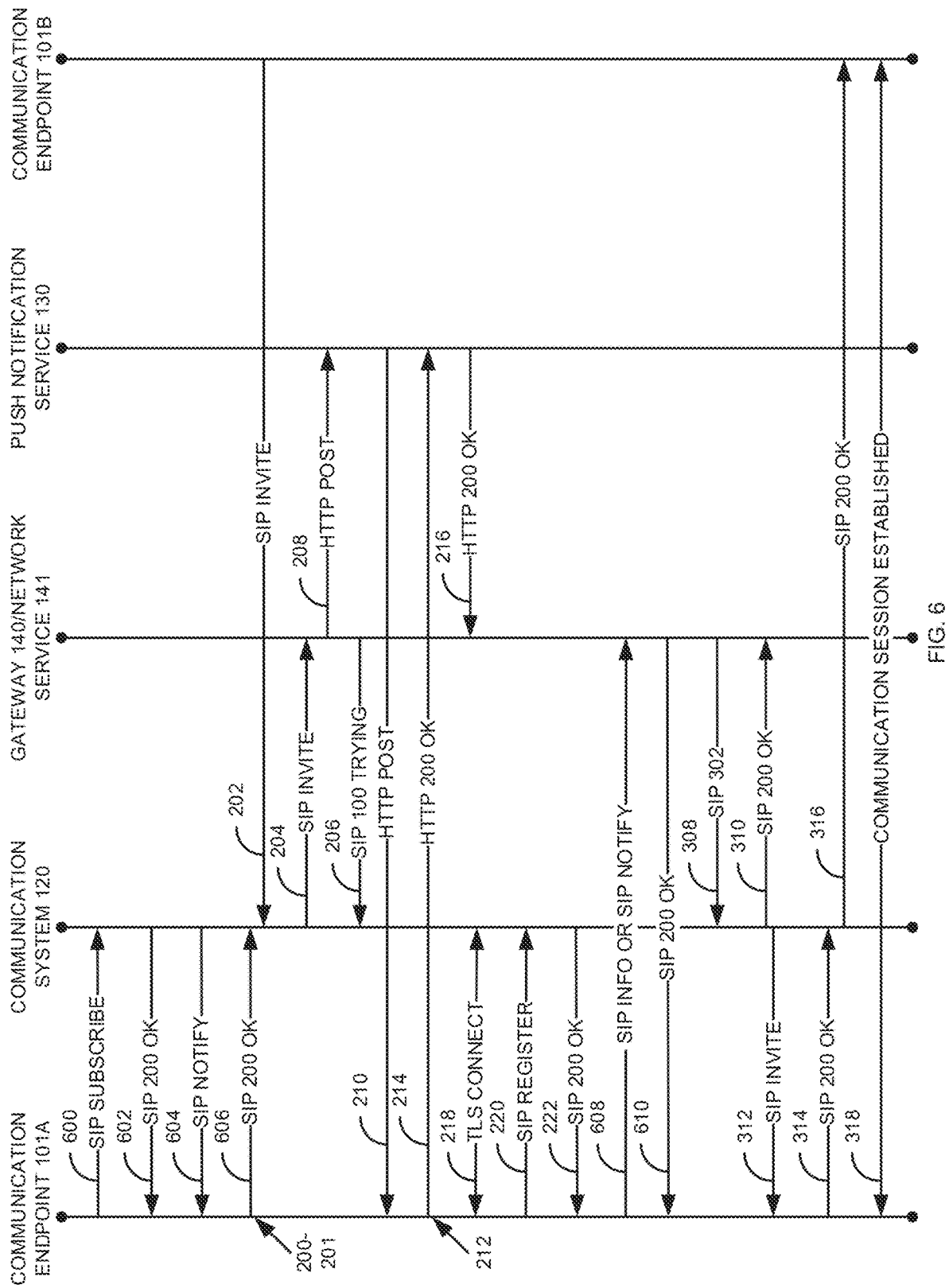
FIG. 6 is a flow diagram of a fifth process for managing a SIP communication session in a push notification network.

FIG. 6 is a flow diagram of a fifth process for managing a SIP communication session in a push notification network. The process starts in step 600 when the communication application 102A sends a SIP SUBSCRIBE message to the communication system 120. The SIP SUBSCRIBE message of step 600 is for a registration event package. The registration event package informs allows the communication application 102A to learn about push notification related SIP registrations (e.g., an incoming call) that the gateway 140/network service 141 had with the communication system 120. The event package includes the contact address of the network service 141. The communication system 120 sends, in step 602, a SIP 200 OK. The communication system 120 sends, in step 604, a SIP NOTIFY message with the event package. For example, the event package in the SIP NOTIFY message may include the following information: sip:web_gateway_address@ip_address; client-type=push-notification-gateway. The communication application 102A sends, in step 606, a SIP 200 OK to the communication system 120.

Steps 200-222 are then implemented in the same manner discussed above in FIG. 2 where the communication application 102A is un-suspended or activated by the push notification service 130 (steps 200-216), the communication application 102A connects (step 218), and registers with the communication system 120 (steps 220-222).

The communication application 102A sends, in step 608 a SIP NOTIFY message or a SIP INFO message that uses the contact address of the network service 141 that was received in the event package of the SIP NOTIFY message of step 604. The SIP NOTIFY message or the SIP INFO message of step 608 notifies the gateway 140/network service 141 that the communication application 102A is now active and can establish a communication session. In response, the gateway 140/network service 141 sends, in step 610 a SIP 200 OK message to the communication application 102A.

In response to receiving the SIP INFO or SIP NOTIFY message of step 608, the process described above for FIG. 3 of steps 308-318 are implemented in a similar manner of sending a SIP 302 MOVED TEMPORARILY message (step 308), sending a SIP 200 OK (step 310), sending a SIP INVITE message (step 312), sending a SIP 200 OK message (steps 314 and 316), and establishing the communication session/media stream (step 318).

FIGS. 2-6 describes, in step 220, where the communication application 102A sends a SIP REGISTER message to the communication system 120. However, in another embodiment, instead of the communication application 102A sending a SIP REGISTER message, the communication system 120 can periodically poll the communication application 102A (e.g., every few seconds). The polling can start based on receiving the SIP INVITE message of step 202 to wait until the communication application 102A becomes active.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
determine that a communication application is running on a first communication endpoint;
create an instance of a network service that corresponds to the communication application, wherein the instance of the network service is created to handle requests while the communication application has been suspended or is not running;
receive a first Session Initiation Protocol (SIP) INVITE message to establish a communication session, wherein the communication application, in the first communication endpoint that is used to establish the communication session, has been suspended or is not running;
send a first message that causes the communication application to become active; and
receive a second message that indicates that the communication application is active, wherein the communication session is established based on one or more of:
receiving a SIP MOVED TEMPORARILY message and, in response to receiving the SIP MOVED TEMPORARILY message, sending a second SIP INVITE message to the communication application based on a SIP redirection address in the SIP MOVED TEMPORARILY message;
receiving the SIP MOVED TEMPORARILY message, wherein the SIP MOVED TEMPORARILY message is sent in response to an HTTP POST message sent by the communication application and, in response, sending the second SIP INVITE message to the communication application;
receiving the SIP MOVED TEMPORARILY message, wherein the SIP MOVED TEMPORARILY message is sent in response to a SIP INFO message or a SIP NOTIFY message sent by the communication application and, in response, sending the second SIP INVITE message to the communication application to establish the communication session; and
(iv) sending the second SIP INVITE message to the communication application in response to receiving the second message from the communication application that indicates that the communication application is active.

2. The system of claim 1, wherein the second message is a SIP REGISTER message.

3. The system of claim 1, wherein the second message is received based on a sent polling message.

4. The system of claim 1, wherein the microprocessor sends a SIP NOTIFY message that causes the communication application to send a third SIP INVITE message with one of a Replaces header and a Join header to a second communication endpoint.

5. The system of claim 4, wherein the communication application sends the third SIP INVITE message with the Replaces header message and wherein the SIP NOTIFY message contains a contact identifier for the network service that is replaced in the communication session by the communication application in the third SIP INVITE message with the Replaces header message.

6. The system of claim 1, wherein the microprocessor receives the SIP MOVED TEMPORARILY message and, in response, sends the second SIP INVITE message to the communication application based on the SIP redirection address in the SIP MOVED TEMPORARILY message.

7. The system of claim 6, wherein the microprocessor sends a SIP NOTIFY message to the network service, and wherein the SIP MOVED TEMPORARILY message is sent in response receiving the SIP NOTIFY message.

8. The system of claim 1, wherein the microprocessor receives the SIP MOVED TEMPORARILY message, wherein the SIP MOVED TEMPORARILY message is sent in response to the SIP INFO or the SIP NOTIFY message sent by the communication application and, in response, sends the second SIP INVITE message to the communication application to establish the communication session.

9. The system of claim 1, wherein the microprocessor sends the second SIP INVITE message to the communication application in response to receiving the second message from the communication application that indicates that the communication application is active.

10. The system of claim 1, wherein the microprocessor executes step (ii) receives the SIP MOVED TEMPORARILY message, wherein the SIP MOVED TEMPORARILY message is sent in response to the HTTP POST message sent by the communication application and, in response, sends the second SIP INVITE message to the communication application.

11. The system of claim 1, wherein the communication session is between the first communication endpoint and a second communication endpoint, wherein the microprocessor sends the second SIP INVITE message to the network service that has been instantiated to act on behalf of the communication application that has been suspended or is not running, and wherein the network service sends an HTTP POST message to a push notification service to activate the communication application.

12. A method comprising:
determining, by a microprocessor, that a communication application is running on a first communication endpoint;
creating an instance of a network service that corresponds to the communication application, wherein the instance of the network service is created to handle requests while the communication application has been suspended or is not running;
receiving, by the microprocessor, a first Session Initiation Protocol (SIP) INVITE message to establish a communication session, wherein the communication application, in the first communication endpoint that is used to establish the communication session, has been suspended or is not running;
sending, by the microprocessor, a first message that causes the communication application to become active; and
receiving, by the microprocessor, a second message that indicates that the communication application is active, wherein the communication session is established based on one or more of the following:
receiving, by the microprocessor, a SIP MOVED TEMPORARILY message and, in response to receiving the SIP MOVED TEMPORARILY message, sending, by the microprocessor, a second SIP INVITE message to the communication application based on a SIP redirection address in the SIP MOVED TEMPORARILY message;

receiving, by the microprocessor, the SIP MOVED TEMPORARILY message, wherein the SIP MOVED TEMPORARILY message is sent in response to an HTTP POST message sent by the communication application and, in response, sending, by the microprocessor, the second SIP INVITE message to the communication application;

receiving, by the microprocessor, the SIP MOVED TEMPORARILY message, wherein the SIP MOVED TEMPORARILY message is sent in response to a SIP INFO message or a SIP NOTIFY message sent by the communication application and, in response, sending, by the microprocessor, the second SIP INVITE message to the communication application; and (iv) sending, by the microprocessor, the second SIP INVITE message to the communication application in response to receiving the second message from the communication application that indicates that the communication application is active.

13. The method of claim 12, wherein the microprocessor sends a SIP NOTIFY message that causes the communication application to send a third SIP INVITE message with one of a Replaces header and a Join header to a second communication endpoint.

14. The method of claim 13, wherein the communication application sends the third SIP INVITE message with the Replaces header message and wherein the SIP NOTIFY message contains a contact identifier for the network service that is replaced in the communication session by the communication application in the third SIP INVITE message with the Replaces header message.

15. The method of claim 12, wherein the microprocessor receives the SIP MOVED TEMPORARILY message and, in response, sends the second SIP INVITE message to the communication application based on the SIP redirection address in the SIP MOVED TEMPORARILY message.

16. The method of claim 15, wherein the microprocessor sends a SIP NOTIFY message to the network service, and wherein the SIP MOVED TEMPORARILY message is sent in response receiving the SIP NOTIFY message.

17. The method of claim 12, wherein the microprocessor receives the SIP MOVED TEMPORARILY message, wherein the SIP MOVED TEMPORARILY message is sent in response to the SIP INFO or the SIP NOTIFY message sent by the communication application and, in response, sends the second SIP INVITE message to the communication application to establish the communication session.

18. The method of claim 12, wherein the microprocessor sends the second SIP INVITE message to the communication application in response to receiving the second message from the communication application that indicates that the communication application is active.

19. The method of claim 12, wherein the microprocessor receives the SIP MOVED TEMPORARILY message, wherein the SIP MOVED TEMPORARILY message is sent in response to the HTTP POST message sent by the communication application and, in response, sends the second SIP INVITE message to the communication application.

20. A method comprising:
determining, by a microprocessor, that a communication application is running on a first communication endpoint;

creating, by the microprocessor, an instance of a network service that corresponds to the communication application, wherein the instance of the network service is created to handle requests while the communication application is suspended or not running;

receiving, by the microprocessor, a first Session Initiation Protocol (SIP) INVITE message to establish a communication session with the communication application, wherein the communication application has been suspended or is not running;

sending, by the microprocessor, a first message that causes the communication application to become active;

keeping, by the microprocessor, the communication session active until the communication session can be established with the communication application;

receiving, by the microprocessor, a second message that indicates that the communication application is active; and establishing the communication session with the communication application based on one or more of:
receiving, by the microprocessor, a SIP MOVED TEMPORARILY message and, in response to receiving the SIP MOVED TEMPORARILY message, sending, by the microprocessor, a second SIP INVITE message to the communication application based on a SIP redirection address in the SIP MOVED TEMPORARILY message;

receiving, by the microprocessor, the SIP MOVED TEMPORARILY message, wherein the SIP MOVED TEMPORARILY message is sent in response to an HTTP POST message sent by the communication application and, in response, sending, by the microprocessor, the second SIP INVITE message to the communication application;

receiving, by the microprocessor, the SIP MOVED TEMPORARILY message, wherein the SIP MOVED TEMPORARILY message is sent in response to a SIP INFO message or a SIP NOTIFY message sent by the communication application and, in response, sending, by the microprocessor, the SIP INVITE message to the communication application; and sending, by the microprocessor, the SIP INVITE message to the communication application in response to receiving the second message from the communication application that indicates that the communication application is active.

* * * * *

UNITED STATES PATENT AND TRADEMARK OFFICE
CERTIFICATE OF CORRECTION

PATENT NO. : 10,880,338 B2  
APPLICATION NO. : 15/890998  
DATED : December 29, 2020  
INVENTOR(S) : Mehmet Balasaygun and Eric Cooper Page 1 of 1

It is certified that error appears in the above-identified patent and that said Letters Patent is hereby corrected as shown below:

In the Claims

At Column 16, Line 24, please delete "executes step (II)".

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*